(12) United States Patent  (10) Patent No.: US 7,798,280 B2
Simoni et al.  (45) Date of Patent: Sep. 21, 2010

(54) HYDRAULIC STEERING SYSTEM FOR A VEHICLE

(75) Inventors: Marco Simoni, Modena (IT); Sergio Magrini, Modena (IT)

(73) Assignee: CNH America LLC, New Holland, PA (US)

( * ) Notice: Subject to any disclaimer, the term of this patent is extended or adjusted under 35 U.S.C. 154(b) by 167 days.

(21) Appl. No.: 12/245,338

(22) Filed: Oct. 3, 2008

(65) Prior Publication Data

US 2009/0095561 A1 Apr. 16, 2009

(51) Int. Cl.
*B62D 5/097* (2006.01)
(52) U.S. Cl. .................. 180/403; 180/417; 180/432; 180/441; 180/442
(58) Field of Classification Search .............. 180/403, 180/417, 432, 441, 442
See application file for complete search history.

(56) References Cited

U.S. PATENT DOCUMENTS

| RE25,126 | E | * | 2/1962 | Charlson | 91/467 |
| 3,452,543 | A | * | 7/1969 | White, Jr. et al. | 60/384 |
| 3,688,860 | A | * | 9/1972 | Molby | 180/420 |
| RE31,067 | E | * | 10/1982 | Roberts | 418/61.3 |
| 4,936,094 | A | * | 6/1990 | Novacek | 60/384 |
| 4,953,647 | A | * | 9/1990 | Leboime | 180/9.1 |
| 4,972,916 | A | * | 11/1990 | Miller | 180/414 |
| 7,179,070 | B2 | * | 2/2007 | O'Brien, II | 418/206.1 |
| 7,588,431 | B2 | * | 9/2009 | O'Brien, II | 418/206.1 |
| 2004/0238300 | A1 | * | 12/2004 | Cherney | 188/267 |
| 2007/0017730 | A1 | | 1/2007 | Beck | |
| 2007/0251755 | A1 | * | 11/2007 | Entwistle et al. | 180/417 |

FOREIGN PATENT DOCUMENTS

| DE | 1480205 | 4/1969 |
| DE | 19714785 | 10/1998 |
| EP | 0926045 | 6/1999 |

* cited by examiner

*Primary Examiner*—Lesley Morris
*Assistant Examiner*—Marlon A Arce
(74) *Attorney, Agent, or Firm*—Patrick M. Sheldrake; John William Stader; Michael G. Harms

(57) ABSTRACT

A steering system for an agricultural vehicle with a hydraulic steering motor incorporates an internal pump, a distribution valve, an input shaft which in use is coupled for rotation by the steering shaft of a vehicle steering wheel, and connectors for hydraulic lines leading to a high pressure source of oil, to an oil reservoir and to hydraulic actuators connected to the steerable wheels of the vehicle. The steering motor is located remotely from the steering shaft and is coupled for rotation with shaft by hydraulic rotary actuators mounted on the steering shaft and the input shaft of the steering motor and arranged in a closed circuit with one another.

5 Claims, 1 Drawing Sheet

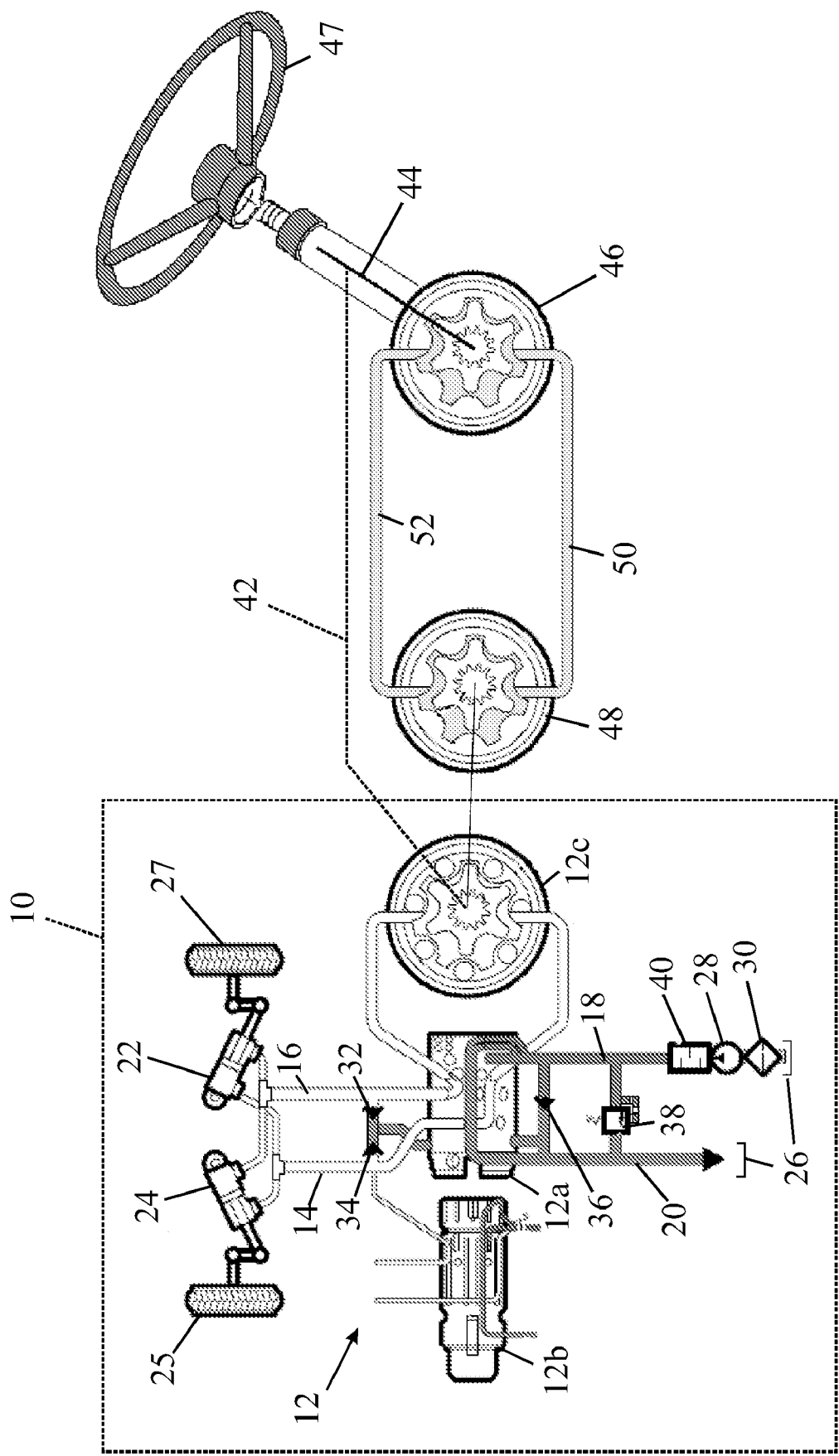

HYDRAULIC STEERING SYSTEM FOR A VEHICLE

FIELD OF THE INVENTION

The present invention relates to a steering system for an agricultural or construction vehicle of the type comprising a hydraulic steering motor.

BACKGROUND OF THE INVENTION

Hydraulic steering systems are commonly used in agricultural vehicles, such as tractors and harvesters, that require power-assisted steering. The steering motor comprises a pump that is rotated by the torque applied to the steering wheel and a distribution valve. The distribution valve acts to direct the high pressure hydraulic fluid, herein termed oil for simplicity, generated by the internal pump to hydraulic steering actuators connected to the steerable wheels and to direct oil returning from the actuators to reservoir. The construction of the steering actuators is not material to the present invention and they may comprise two separate hydraulic jacks or a cylinder with a double acting piston.

The term "hydraulic steering motor" is used in its normally accepted sense to refer to a device that incorporates an internal pump, a distribution valve, an input shaft which in use is coupled for rotation by the steering shaft of a vehicle steering wheel, and connectors for hydraulic lines leading to a high pressure source of oil, to an oil reservoir and to hydraulic actuators connected to the steerable wheels of the vehicle.

In this way, as the steering wheel is turned, oil is supplied to the steering actuators to move the steerable wheels in the required direction and by an amount determined by the extent of rotation of the steering wheel.

In order to reduce the driver effort, an auxiliary pump is connected to the steering motor to supply it with oil under high pressure. The distribution valve serves to apply the high pressure oil to the steering actuators in a manner to supplement the oil pressure generated by the internal pump, thereby providing power assistance.

Thus, in the absence of an external high pressure source, the torque applied by the driver to drive the internal pump of the steering motor is of itself sufficient to steer the vehicle. When high pressure oil is available from the auxiliary pump, however, it is applied through the distribution valve to the wheel actuators in parallel with the oil from the internal pump so that the wheels are turned by the same desired amount but without as much driver effort.

Conventionally, the input shaft of the steering pump is directly coupled to the lower end of the steering shaft on which the vehicle steering wheel is mounted and the body of the steering pump is located within the driver's cabin.

A problem of such conventional mounting of the steering pump is that space within the cabin is often at a premium and the steering pump can prove an unpleasant source of noise.

SUMMARY OF THE INVENTION

With a view to mitigating the foregoing disadvantages, the present invention provides a steering system of an agricultural vehicle of the type comprising a hydraulic steering motor (as above defined), wherein the steering motor is located remotely from the steering shaft and is coupled for rotation therewith by hydraulic rotary actuators mounted on the steering shaft and the input shaft of the steering motor and arranged in a closed circuit with one another.

Preferably, the rotary actuators mounted on the steering shaft and the steering motor are cycloidal or gerotor pumps and motors.

A gerotor is a known hydraulic machine that can function as a pump or as a motor and is of the N,N−1 type of machine. Such machines, of which the well-known Wankel engine is an example, comprise a rotor with N outwardly facing lobes rotating eccentrically inside a body with N−1 inwardly facing lobes. The lobes are shaped as epitrochoids and hypotrochoids so that they remain in contact with one another at all times to define N working chambers, each of which expands then contracts as the rotor rotates.

In the case of a gerotor, the body with N−1 inwardly facing lobes is itself a second rotor rotating in the same direction as the rotor with N outwardly facing lobes. This rotation of the second rotor enables the working chambers to communicate with stationary high pressure and low pressure ports. Once again, as gerotors are themselves known and well described in the prior art, they need not be described in greater detail in the present context. Essentially, the gerotor driven by the steering shaft acts as a pump and that connected to the steering motor as a motor turning the input shaft of the steering motor in proportion to the rotation of the steering wheel. If the two gerotors are identical then, disregarding any internal oil leakage, the steering shaft and the input shaft of the steering motor will rotate by equal amounts but it is possible to provide torque multiplication by using differently dimensioned gerotors.

It has been proposed previously to locate a steering motor remotely from the steering shaft and to connect the two to one another by means of pulleys and cables. Using such a system, however, results in a surprising degree of noise transmission from the steering pump to the interior of the cab. A system using cables also suffers from other disadvantages such as being more prone to wear and more likely to generate free play at the steering wheel.

While it is preferred to use gerotors as the means for hydraulically coupling the steering shaft and the input shaft of the steering pump for rotation with one another, it is possible to use other designs of rotary actuators, such as vane pumps.

BRIEF DESCRIPTION OF THE DRAWINGS

The invention will now be described further, by way of example, with reference to the accompanying drawing.

The FIGURE is a schematic representation of a steering system constructed in accordance with the present invention.

DETAILED DESCRIPTION OF THE PREFERRED EMBODIMENT

The single FIGURE shows a steering system in which all the components lying within the box 10 drawn in dotted lines represent a conventional hydraulic power-assisted steering system and these will be briefly described first.

The steering motor 12 is represented in the drawing by three separate parts, namely a housing 12a, a distribution valve spool 12b and an internal pump 12c, itself constructed in the illustrated embodiment as a gerotor pump. The housing 12a has connectors for four hydraulic lines 14, 16, 18 and 20. An input shaft (not shown) of the steering motor serves to drive the gerotor pump 12 and to rotate the valve spool 12b relative to the housing 12a.

The lines 14 and 16 lead to hydraulic actuators 22 and 24 shown as double acting hydraulic jacks with differential pistons that act on the steerable wheels 25 and 27 of the vehicle. The line 18 is a high pressure supply line and the line 20 a return line. Oil in the high pressure line 18 is drawn from a reservoir 26 by an auxiliary pump 28 by way of a filter 30. The power-assisted steering system also includes various non-return valve 32, 34 and 36 and a high pressure regulating or relief valve 38 as well as a device 40 used for cavity control.

As this is a typical power-assisted steering system using a conventional commercially available steering motor, it is believed that its operation will be clear to the person skilled in the art without the need for further explanation.

Conventionally, as represented by the dotted line 42 in the drawing, the input shaft of the steering motor 12 is directly coupled to the steering shaft 44 of the steering wheel 47 of the vehicle. This requires the steering motor 12 to be physically mounted inside vehicle cab which is not always convenient. Apart from space requirement, the ability of the cab of an agricultural vehicle to move relative to the chassis creates complications as shock absorbing mountings need to be used for mounting the steering motor 12 in the cab and flexible hoses must be used for the hydraulic lines 16 to 20.

To avoid these problems, the present invention proposes separating the steering motor 12 from the steering shaft 44. This permits the steering motor to be mounted on the chassis of the vehicle and allows the hydraulic lines to be constructed as rigid pipes. To permit the steering shaft 44 to drive the input shaft of the steering motor 12, a rotary hydraulic coupling is provided which comprises two gerotors 46 and 48 connected by lines 50 and 52 in a closed circuit.

The gerotor 46 is directly coupled to the steering shaft 44 within the cab and acts as a hydraulic pump. The gerotor 48, on the other hand, is mounted remotely on the input shaft of the steering pump 12 and acts as a motor driven by the hydraulic pressure created in lines 50 and 52 by the gerotor pump 46.

In the invention, there are only two hydraulic lines entering the cab and they need only be low pressure lines as they are only used to transmit the torque applied to the steering wheel 47. It is therefore believed possible to use plastics or other synthetic material in the manufacture of the gerotors 46 and 48 and the lines 50 and 52.

Unlike the steering pump 12, which conventionally needs to be mounted on shock absorbing supports on account of the ripple pressure in the hydraulic lines 14 to 20, the gerotor 46 connected to the steering shaft in the present invention may be rigidly mounted on the body of the cab, which in turn simplifies the connection between the gerotor 46 and the steering shaft 44.

A further advantage offered by the invention is that the relocation of the steering pump 12 outside the cab allows it, if desired, to be integrated into other components of the steering system, such as the auxiliary pump 28 or the actuators 22, 24. The resulting reduction in the length of the lines 14 to 20 makes for a neater installation, with less risk of damage to the hydraulic lines.

Noise in the cab is reduced because of the remote location of the steering pump and the use of hydraulic lines 50 and 52, as opposed to cables, ensure that little of the noise is transmitted back into the cab.

A still further advantage of the invention is that the transmission ratio between the steering shaft and the steering motor may be varied by simply replacing one of the gerotors 46 and 48 with one having a different displacement.

Having thus described the invention, what is claimed is:

1. A steering system for a vehicle comprising:
a hydraulic steering motor, wherein the steering motor is located remotely from a steering shaft and is coupled for rotation therewith by a first gerotor operatively coupled to the steering shaft and a second gerotor mounted remotely on an input shaft of the steering pump and arranged in a closed circuit with one another.

2. A steering system as claimed in claim 1, wherein the hydraulic steering motor has an internal pump, a distribution valve, an input shaft which in use is coupled for rotation by the steering shaft of a vehicle steering wheel, and connectors for hydraulic lines leading to a high pressure source of oil, to an oil reservoir and to the gerotors.

3. A steering system as claimed in claim 1, in which the gerotor mounted on the steering shaft and the steering motor, respectively, have a different displacement from one another.

4. A steering system as claimed in claim 1, wherein at least one of the gerotors and the hydraulic lines connecting the gerotors in a closed circuit with one another is formed of a synthetic or plastic material.

5. A steering system as claimed in claim 1, wherein the gerotor mounted on the steering shaft is rigidly mounted in the cab of the vehicle.

\* \* \* \* \*